(No Model.)
C. W. SHARTLE.
SLIP COLLAR FOR PULLEYS, SHAFTS, &c.
No. 521,055. Patented June 5, 1894.
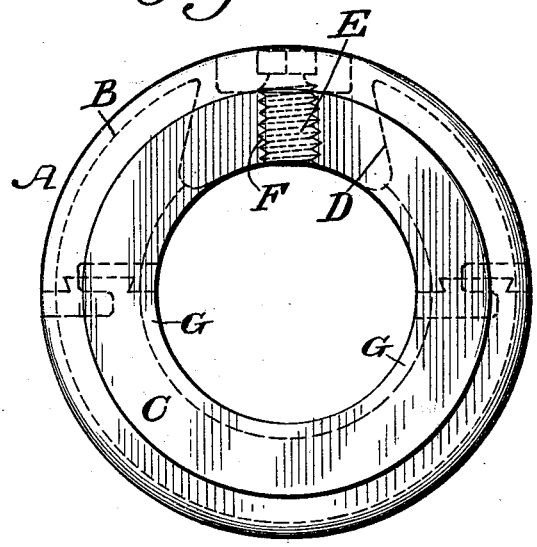
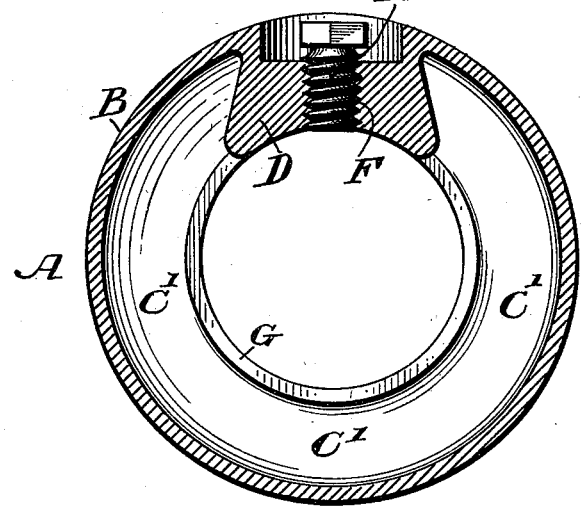
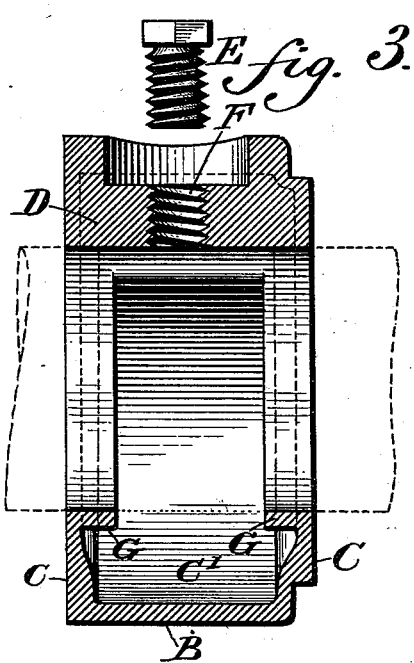
WITNESSES:
L. Douville,
A. P. Jennings.
INVENTOR
Charles W. Shartle
BY
John A. Wiedersheim
ATTORNEY.

UNITED STATES PATENT OFFICE.

CHARLES W. SHARTLE, OF MIDDLETOWN, OHIO, ASSIGNOR TO THE MIDDLE-TOWN MACHINE COMPANY, OF OHIO.

SLIP-COLLAR FOR PULLEYS, SHAFTS, &c.

SPECIFICATION forming part of Letters Patent No. 521,055, dated June 5, 1894.

Application filed October 24, 1893. Serial No. 489,026. (No model.)

*To all whom it may concern:*

Be it known that I, CHARLES W. SHARTLE, a citizen of the United States, residing at Middletown, in the county of Butler, State of Ohio, have invented a new and useful Improvement in Slip-Collars for Pulleys, Shafts, &c., which improvement is fully set forth in the following specification and accompanying drawings.

My invention consists of a slip collar for a pulley, shaft, &c., the same being formed of a peripheral rim, annular flanges on the sides of said rim, a head projecting inwardly from said rim between portions of the side flanges, and a set screw fitted to said head adapted to engage the pulley, &c., the portion of the space between the flanges not occupied by the head, being hollow, thus producing a lighter, stronger and more effective collar, as will be hereinafter set forth.

Figure 1 represents a side elevation of a slip collar embodying my invention. Figs. 2 and 3 represent sections thereof at a right angle to each other, the collar being shown as whole and not divided as in said Fig. 1.

Similar letters of reference indicate corresponding parts in the several figures.

Referring to the drawings: A designates a slip collar which is formed of the peripheral rim B, the annular side flanges C, the head D, and set screw E, said rim, flanges and head being cast together as one. The head D projects inwardly from the rim B into a portion of the space between the flanges C, and joins said flanges, it being noticed that the remaining portion of said space is hollow as at C'. The screw E occupies a radial opening F in the head, D, and has its point adapted to tighten against the hub of a pulley, a shaft, &c., as shown in dotted lines Fig. 3, which hub, shaft, &c., is passed through the openings in the side flanges.

In order to increase the bearing surface of the flanges C, the inner portions of the same have the projections G extending inwardly therefrom, as most clearly shown in Fig. 3, said portions also strengthening the side flanges about the openings thereon. Now as the side flanges are cast with or join the peripheral rim B, the strength of the collar is vastly increased, while the space between said flanges, which makes the collar comparatively hollow, reduces the weight of the device, and renders the latter more effective.

The collar may be divided or split, as shown in dotted lines Fig. 1, for convenience in applying and removing the same to and from hubs, wheels, &c.

Having thus described my invention, what I claim as new, and desire to secure by Letters Patent, is—

1. A slip collar formed of a peripheral rim, annular side flanges with a space between the same, a head projecting inwardly from the rim and joining the adjacent portions of the side flanges, and a set screw in said head, said side flanges joining the peripheral rim, substantially as described.

2. A slip collar consisting of a peripheral rim having annular side flanges with projections on the inner portions of the same, a head projecting inwardly from said rim, and having a radial opening therein, and a screw working in said opening, said parts being combined substantially as described.

3. A slip collar formed of a split peripheral rim, split annular flanges at the sides thereof, a head projecting forwardly from the rim and joining the adjacent portions of the side flanges, and a set screw in said head, said side flanges joining the peripheral rim and forming a bearing for the hub or shaft, to which the collar is applied, substantially as described.

CHARLES W. SHARTLE.

Witnesses:
T. H. MITCHELL,
C. C. DONLEY.